June 11, 1940. H. C. PIERCE 2,204,000
RAIL CAR MOVER
Filed Feb. 28, 1939 3 Sheets-Sheet 2
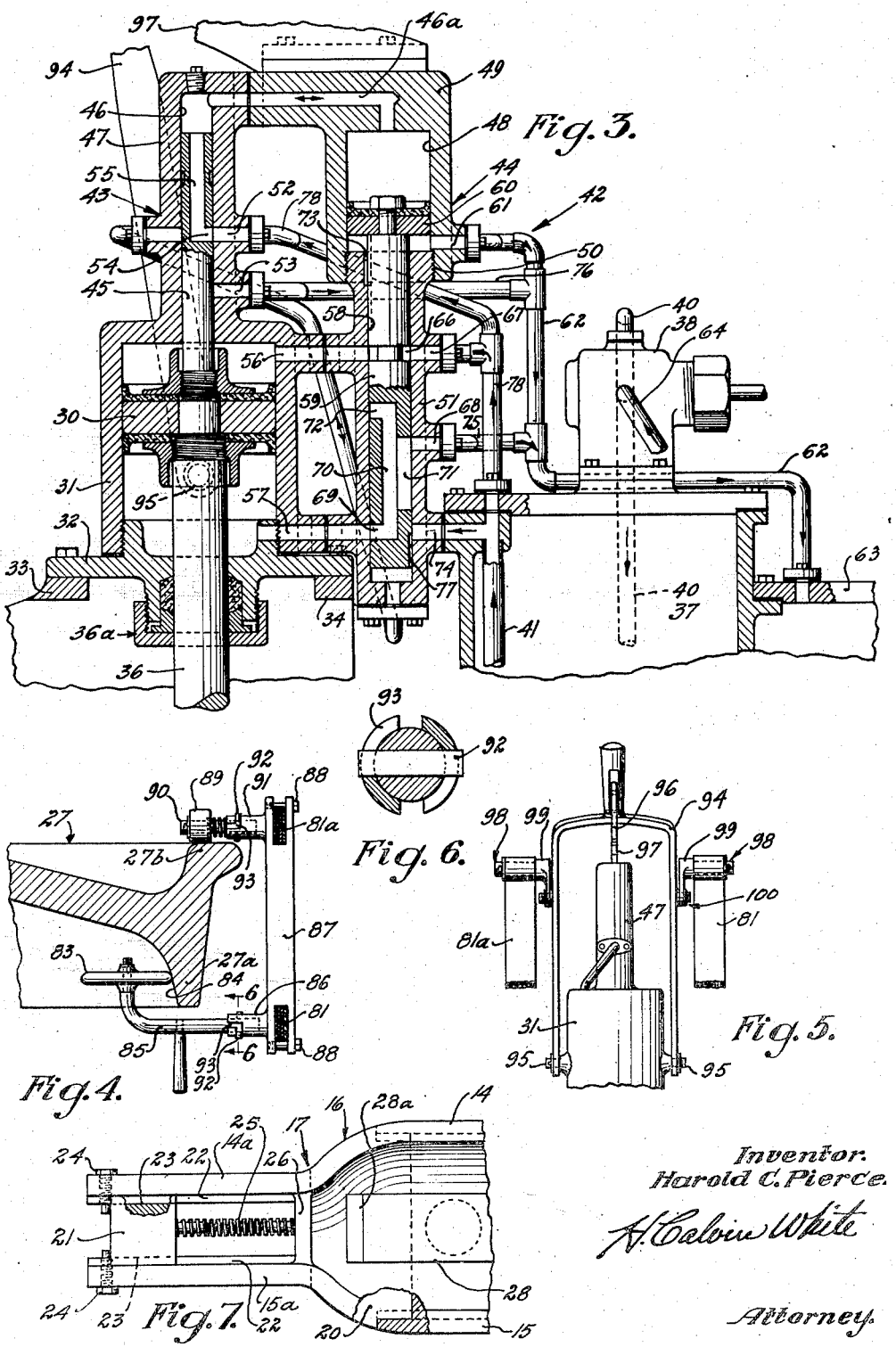
Inventor:
Harold C. Pierce.
H. Calvin White
Attorney June 11, 1940.  H. C. PIERCE  2,204,000
RAIL CAR MOVER
Filed Feb. 28, 1939  3 Sheets-Sheet 3
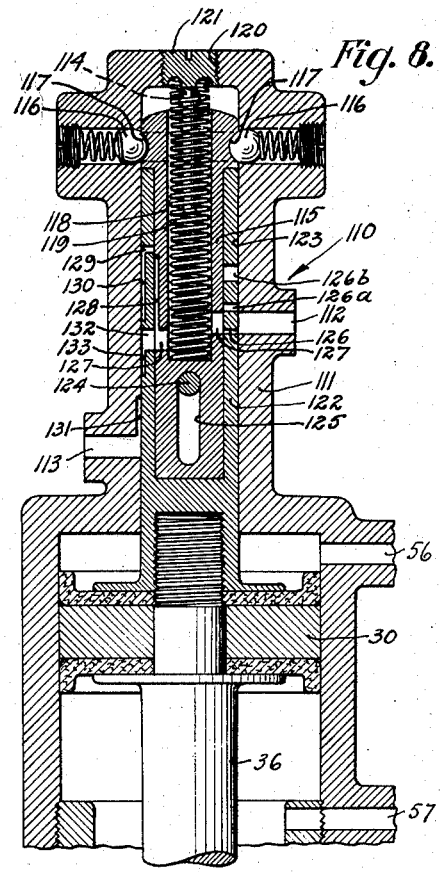
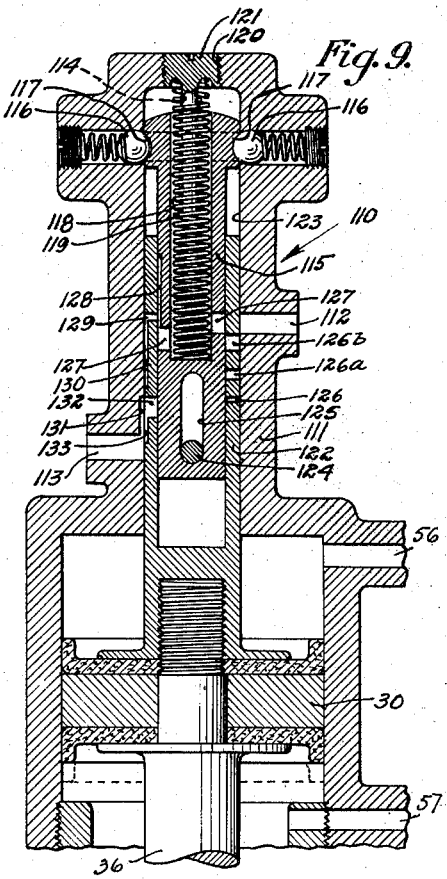
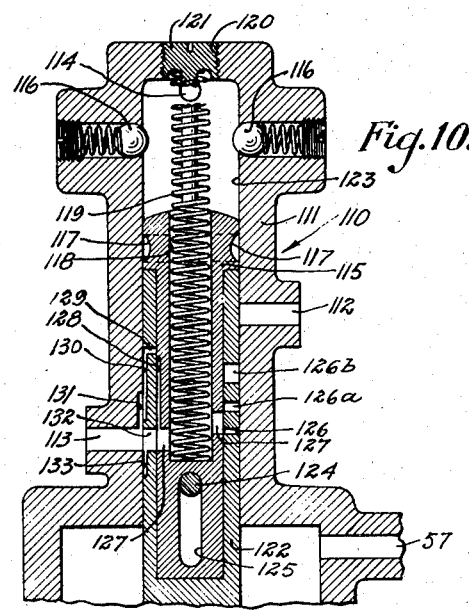
Inventor.
Harold C. Pierce.
Attorney.

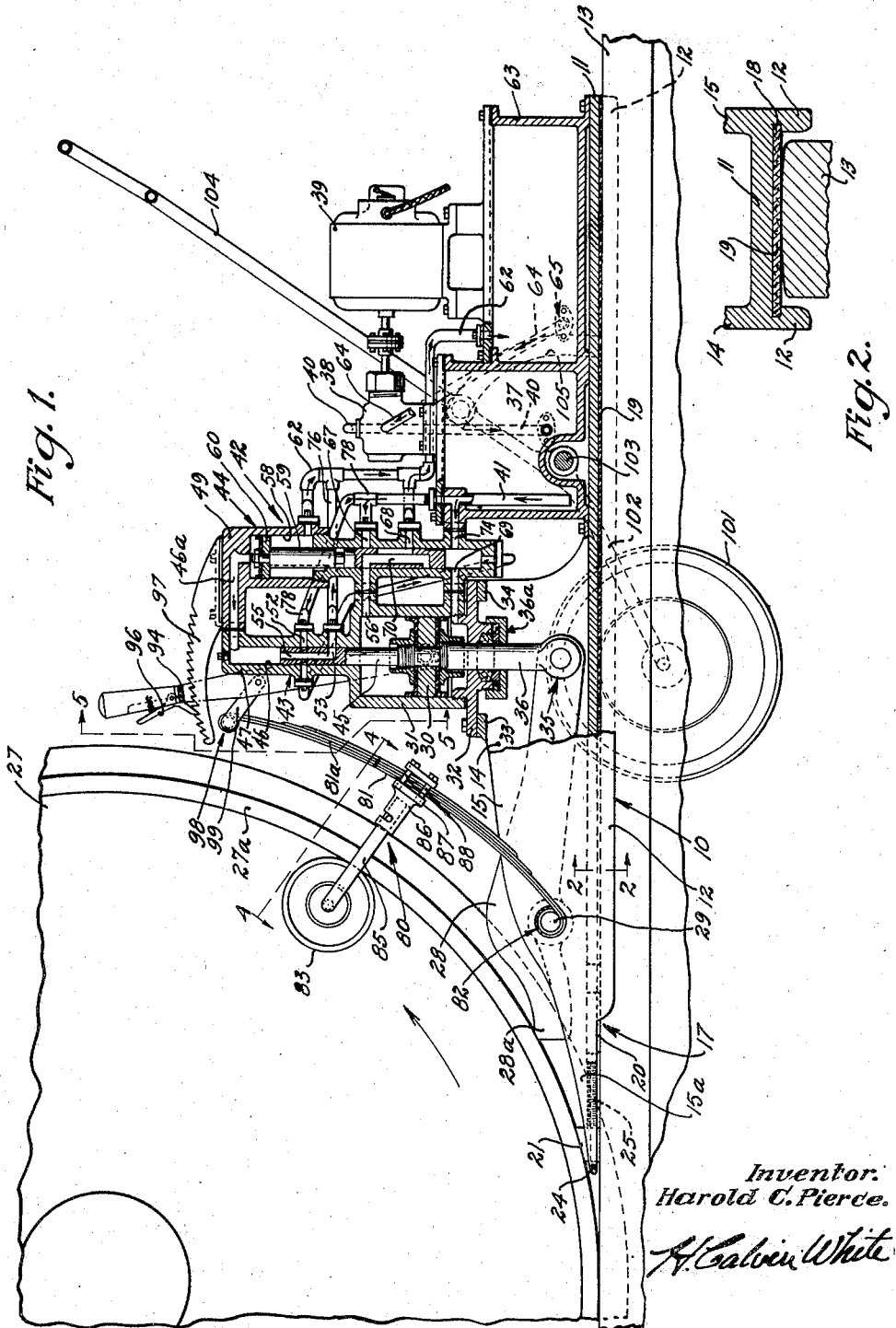

Patented June 11, 1940

2,204,000

UNITED STATES PATENT OFFICE 2,204,000

RAIL CAR MOVER

Harold C. Pierce, Pomona, Calif.

Application February 28, 1939, Serial No. 258,960

20 Claims. (Cl. 254—38)

This invention has to do with improvements in portable power driven rail car movers of the type adapted to be seated on the rail and applied to the car wheel to advance the car along the track. In certain of its more specific aspects the invention has for its object to improve the efficiency and operating characteristics of such mechanisms by the use of a fluid or hydraulic power transmission possessing various advantages over the conventional mechanical drives heretofore proposed.

Car movers of the present type comprise a driving means applied directly to the car wheel, and a power source, such as a motor or engine, operatively connected to the driving means. In accordance with the invention I have been able to better adapt the power characteristics of a continuously running engine or motor to a wheel driving means, particularly of the reciprocating or oscillating lever type, by interposing an hydraulic power transmission between the motor and the driving lever. Among the advantages gained are smoother and more uniform application of power to the lever, reduction in the required cost and size of the motor, and general economy in the mechanism as a whole.

This mechanism may be described generally as comprising in its preferred form, a pressure container or accumulator into which the operating fluid is continuously discharged by a positive displacement pump operated by the motor. The driving lever is actuated in both directions of its movement by a piston contained in a cylinder to which the operating fluid is delivered from the accumulator under control of an automatic valve mechanism. Fluid is discharged from the piston cylinder to a supply chamber or reservoir from which the pump takes suction. The accumulator serves as a source of constant and stable pressure supply for the lever operating piston and also as a surge chamber compensating for any differentials in the rate of fluid discharge from the pump and the rate of fluid delivery to the piston cylinder.

Any suitable automatic valve mechanism may be provided for controlling communication of the accumulator fluid pressure to the piston, although I prefer to use a valve mechanism comprising a pilot valve operated or controlled by the piston, and a fluid pressure actuated master valve which, in turn, is controlled by the pilot valve. According to one form of the invention, the pilot valve may be carried by and movable with the piston throughout its travel in both directions. The pilot valve causes the accumulator fluid pressure ultimately to be communicated to and exhausted from opposite ends of the master valve, while the master valve causes the accumulator pressure to be alternately communicated to and exhausted from opposite ends of the piston. Another form of the invention provides a variational type of pilot valve mechanism designed to preclude any possibility of the hydraulic power mechanism becoming stalled, in which the valve is movable relative to the piston and is releasably held by a latch mechanism so as to have a snap-action when operated by the piston at a predetermined point in its travel, all as hereafter explained.

The invention also has for its object to provide an improved connection between the car mover carriage, and the car wheel being driven, whereby the carriage is caused automatically to follow the wheel as the latter advances. Various features and objects, in addition to those mentioned above, may be explained to better advantage without necessity for further preliminary remarks in the following detailed description of the invention as embodied in a typical and illustrative form. Throughout the description reference is had to the accompanying drawings, in which:

Fig. 1 shows a general elevation of the car mover with certain parts illustrated in longitudinal section;

Fig. 2 is an enlarged fragmentary section on line 2—2 of Fig. 1;

Fig. 3 is a fragmentary enlargement of the piston and valve mechanism;

Figs. 4 and 5 are fragmentary views taken as indicated by lines 4—4 and 5—5, respectively, of Fig. 1;

Fig. 6 is an enlarged cross section on line 6—6 of Fig. 4;

Fig. 7 is a plan view of the forward end of the carriage; and

Figs. 8, 9 and 10 are fragmentary sectional views showing in its different operating positions, a variational form of pilot valve mechanism of the snap-acting type.

Referring first to the general view of Fig. 1, the car mover comprises an elongated carriage, generally indicated at 10, having an inverted channel shaped base 11, see Fig. 2, with depending guide flanges 12 at opposite sides of the rail 13 on which the carriage rests in operative position. The forward portion of the carriage includes a pair of transversely spaced side walls 14 and 15 which house the wheel engaging lever and its connection with the operating piston, as will later appear. As best illustrated in Fig. 7, the side walls 14 and 15 of the carriage converge at 16 into inclined forward extensions 14a and 15a at the extreme front of the carriage. The channel shaped base portion 11 terminates at 17 and is provided with longitudinally continuous grooves 18 into which may be inserted a strip of suitable non-metallic material 19, such as woven or molded brake lining, adapted to rest on the surface of the rail and to have a coefficient of friction sufficient to prevent back-sliding of the carriage and yet enable it to move smoothly forward as the car wheel advances. A relatively short steel plate 20 may be inserted within the forward ends of grooves 18 in order to prevent the friction material 19 from becoming damaged as the carriage encounters irregularities, such as rail joints, in its forward movement.

A wedge block or check 21 having a flat bottom surface adapted to engage the rail surface, and a top surface inclined in conformity with the wheel curvature, is suitably mounted for longitudinal movement between the forward narrowerly spaced walls 14a and 15a of the carriage. The chock 21 is slidable longitudinally on a pair of ribs 22 projecting from the inner surfaces of walls 14a and 15a, and received within longitudinal grooves 23 in the sides of the chock. Normally, the latter is pressed against a pair of stop pins 24 by a coil spring 25 bearing against the transverse carriage web 26. Under operating conditions, the carriage when attached to the car wheel 27 as will presently appear, is advanced with relation to the wheel sufficiently to bring the chock into engagement with the surface of the wheel and partially compress the spring 25. Then as the car wheel moves forward, followed by the carriage through its later described attachment to the wheel, the chock 21 remains continuously pressed against the wheel by the action of spring 25, thus preventing any backward movement of the wheel.

While in the broad aspects of the invention any suitable type of wheel engaging driving member may be used, I preferably employ a vertically reciprocating or oscillating lever 28 mounted between the carriage side walls 14 and 15 on shaft 29. The forward end 28a of the lever is adapted to engage the surface of the wheel 27 and to swing upwardly about shaft 29 so as to rotate the wheel and advance the car along the rail. Lever 28 is operated by a piston 30 contained within cylinder 31 suitably mounted on a base 32, which in turn is supported on transverse members 33 and 34 extending between the carriage walls 14 and 15. The lever has a pin-and-slot connection at 35 with the piston rod 36 extending through a suitable packing gland 36a.

The piston 30 is actuated by high pressure fluid, preferably a low or medium viscosity oil, being discharged into a closed pressure chamber or accumulator 37 by a positive displacement pump 38. I preferably use a rotary type pump which, during operation of the car mover, is continuously driven by a suitable power source 39, for example an electric motor or a small internal combustion engine. The pump 38 continuously discharges the operating fluid through line 40 into the accumulator 37 wherein the fluid is maintained under a desirably high pressure, say from 2000 to 3000 lbs. per sq. in. The operating fluid only partially fills the accumulator chamber leaving an air space above the liquid level therein to permit surging of the fluid to compensate for any differential in the rates at which the fluid is discharged by the pump, and is being taken by the lever operating parts.

Fluid is discharged from the accumulator through line 41 to the piston cylinder 31 under control of a valve mechanism, generally indicated at 42, comprising a piston operated pilot valve 43 and a master valve 44 operated by fluid pressure in accordance with movements of the pilot valve. The pilot valve comprises a cylindric valve rod 45 carried by the piston 30 and operating within a bore 46 in the head 47 of piston cylinder 31. The upper end of bore 46 communicates by way of passage 46a with a cylindric chamber 48 of block 49 which is threaded at 50 on the upper end of the master valve body 51. Within the limits of reciprocation of the piston 30, ports 52 and 53 are alternately placed in communication with passage 46a and the chamber 48, by opening 54 in the pilot valve passage being brought into registration with ports 52 and 53, as will later appear. The master valve body 51 connects by way of passages 56 and 57 with the top and bottom of the piston cylinder 31, and contains an elongated cylindric bore 58 within which the cylindric master valve 59 operates. This valve carries at its upper end a plunger or piston 60 operating within chamber 48, the bottom of the chamber below the piston being vented through port 61 and line 62 leading to the operating fluid supply reservoir 63.

As shown in Fig. 1, the pump 38 takes suction from reservoir 63 through pipe 64 leading from the bottom of the reservoir at 65. The master valve 59 is provided intermediate its ends with an annular groove 66 adapted to register with passage 56 and port 67 when the valve is in its lower position shown in Fig. 3. In this position of the valve, passage 57 is in communication with a port 68 through the lateral opening 69 of the valve passage 70 and a longitudinally extending slot 71 in the side of the valve. As shown in Fig. 1, in the upper position of the valve, passage 56 is in communication with port 68 by way of the valve passage 70 and opening 72. Suitable means such as a key 73 splined to the valve may be provided for preventing its rotation.

In describing the operation of the lever operating piston and valve mechanism, it may be assumed that the piston 30 has reached the limit of its down stroke and that the master valve is in its raised position, all as shown in Fig. 1. The operating fluid pressure is communicated from the accumulator 37 through pipe 41, passage 74, the master valve cylinder and passage 57 into the piston cylinder 31, to move the piston on its up stroke. At this time the cylinder 31 above the piston is vented to the discharge line through passage 56, the valve passage and slot 71, port 68 and pipe 75. Chamber 48 above the master valve piston also is vented to the discharge line 62 through passages 46a, 55, port 53 and pipe 76. The master valve 59 is maintained in its upper position by the operating fluid pressure applied to its lower end through passage 74. It may be mentioned at this point that the side of the master valve opposite passage 74 is recessed as at 77 in order that the accumulator fluid pressure will at all times be maintained against the lower end of the valve.

As the piston 30 moves upward, the pilot valve 45 first closes port 53 and then, within the interval of continued valve movement until opening 54 comes opposite port 52, the pilot valve displaces fluid from the valve bore 46 through passage 46a into chamber 48. Such fluid displacement causes some downward movement of the master valve, but the diameter of the valve bore 46 is made sufficiently small with relation to the diameter of chamber 48, that during the interval within which the pilot valve opening 54 moves out of register with port 53 into register with port 52, the fluid displacement into chamber 48 will be insufficient to move the master valve down to the extent of causing opening 72 to move entirely out of communication with passage 56. Therefore, during upward travel of the piston 30, the cylinder 31 above the piston will remain vented to the discharge line until the limit of the piston stroke is reached, at which point the master valve is thrown to its lower position shown in Fig. 3.

Upon upward movement of the pilot valve to the point of bringing opening 54 into communication with port 52, the high pressure operating fluid is discharged from line 78 connecting with pipe 41, through passages 55 and 46a into chamber 48, with the result that the master valve is moved to its lower position by virtue of the differential in total pressures applied to the piston 60 and the lower end of the valve. Notwithstanding the constant application of operating fluid pressure to the lower end of the valve, the latter will move downward by reason of the greater area of the piston 60 exposed to the same high pressure. Displacement of fluid from bore 58 below the valve resulting from its downward movement, is permitted by reason of the open communication between the valve bore and the accumulator through passage 74.

When the master valve has moved down to the point of bringing the valve recess 66 into registration with passage 56 and port 67, and opening 69 into registration with passage 57, the application of operating fluid pressure to the piston 30 is reversed, the high pressure from line 78 being communicated through port 67 and passage 56 to cylinder 31 above the piston, and the cylinder chamber below the piston being vented to the discharge line 62 through passages 57, 70, port 68 and pipe 75. As during upward movement of the pilot valve, the displacement of fluid from chamber 48 into bore 46 during the interval of downward travel of opening 54 between ports 52 and 53, is insufficient to cause upward movement of the master valve to the extent of closing passages 56 and 57, and port 67.

As will be understood, the piston 30 is adapted to reciprocate rapidly under control of the valve mechanism as described, and to operate the lever 28 at corresponding frequency. Accordingly, once the wheel 27 has been started in movement, the end 28a of the operating lever may be brought into driving engagement with the wheel with sufficient frequency to impart a substantially continuous driving force.

The entire mechanism is caused to follow the wheel and to slide upwardly on the rail by means of an adjustable trailer or follower connection, generally indicated at 80, between the wheel 27 and the carriage. In its preferred form, the follower attachment 80 comprises a pair of leaf-type springs 81 and 81a inclined in the general direction of the wheel curvature, and mounted at 82 on the projecting ends of the driving lever shaft 29. Mounted directly on spring 81 is a roller 83 that engages and rides the inner surface 84 of the wheel flange 27a, see Fig. 4. Roller 83 is carried on an arm 85 received within the socket portion 86 of a clamp bar 87 secured to the two springs 81 and 81a intermediate their ends by bolts 88, the clamp bar being adjustable longitudinally of the springs. Mounted on the opposite end of the clamp bar 87 is a roller 89 that engages the outer surface of the wheel flange 27b to laterally support and stabilize the follower attachment. Roller 89 is carried on a shaft 90 received within the socket 91. The positions of rollers 83 and 89 are made reversible in order to accommodate the follower attachment to a car wheel on either rail, as by providing easily detachable and interchangeable connections between the arm 85 and shaft 90, with the sockets 86 and 91. Such connections may comprise pin and slot joints, each consisting of a pin 92 received within an angular slot 93 in the socket, see Fig. 6.

The spring tension exerted against roller 83 to maintain it in engagement with the wheel surface 84, is adjustable by forked lever 94, see Fig. 5, pivotally mounted at 95 on the sides of the cylinder 31 and carrying a spring pressed pawl 96 engaging a ratchet 97 supported on the block 49. The upper ends of the springs 81 and 81a are pivotally attached at 98 to links 99 which in turn are pivoted at 100 on the sides of the lever 94. As will be apparent, the pressure exerted by roller 83 against the wheel flange may be varied by adjusting lever 94 to control the spring deflection. Since the line of force exerted by roller 83 against the wheel flange is substantially in the direction of the wheel radius at the point of roller contact, the pressure exerted by the spring in applying the driving end 28a of the lever to the wheel, is in the proper direction to maintain the carriage and its supported parts in balance on the rail as against reactive forces from the wheel.

The car mover may be made conveniently portable by mounting it on a suitable arrangement of ground wheels which may be adjusted or elevated to enable the carriage to be set down on the rail. For example, the carriage may be transported on a pair of wheels 101 (shown for convenience of illustration in their lower positions) mounted at opposite sides of the carriage on a pair of arms 102 attached to shaft 103. In order to seat the carriage on the rail, the wheels 101 may be swung upward to elevated position about shaft 103 by downward movement of the handle 104. The wheels then may be held in elevated position by suitably latching the handle 104 to an arcuate guide or bracket 105 mounted at the side of the accumulator 37 and the reservoir 63.

In Figs. 8, 9 and 10 I show a variational form of pilot valve mechanism of the snap-acting type which may be used, if desired, in place of the simple piston-carried form of pilot valve previously described. This variational form of pilot valve mechanism has the advantage of precluding any possibility of the parts of the hydraulic drive mechanism reaching a dead center causing the piston to stall. In Figs. 8 to 10, the piston and the fluid inlet and exhaust ports communicating with the piston chamber are numbered to correspond with the same parts in the previously described views. As before, the pilot valve mechanism, generally indicated at 110, is contained within a body 111 mounted on the piston cylinder and provided with pressure fluid inlet 112 and an exhaust port 113 corresponding to ports 52 and 53 in the first described form, and with a port 114 through which the pressure fluid is communicated to the master valve chamber, which port corresponds to passage 46a in Figs. 1 and 3.

The mechanism 110 comprises a cylindric valve 115 releasably held in its upper position shown in Fig. 8 by a plurality of spring pressed ball detents 116 engaging within an annular recess 117 in the head of the valve. The valve has a counterbore 118 containing a coil spring 119 inserted through the body opening 120 closed by plug 121, the latter being adjustable to vary the spring pressure. A ported sleeve 122 carried by the piston 30 surrounds the valve 115 and has a sliding fit with the cylindric valve surface and the wall of bore 123. The sleeve 122 is movable vertically relative to the valve 115, and has a lost motion connection therewith in the form of a pin 124 carried terminally in the sleeve and extending through the vertical slot 125 in the valve.

When the piston 30 is at the upper limit of its stroke, see Fig. 8, the accumulator fluid pressure is communicated from port 112 through the sleeve port 126, port 127 in the valve, and the valve bore 118 to port 114 leading to the master valve chamber. At this time the sleeve 122 closes off fluid exhaust through port 113. While the piston and sleeve 122 move downward, the pressure fluid continues to flow from port 112 to port 114 through the sleeve ports 126, 126a and 126b of increasing size in upward progression. As the piston approaches the lower limit of its travel, and at substantially the point at which port 126b has moved below port 112 (see Fig. 9) to close off communication of the operating fluid pressure to the master valve, pin 124 engages the lower end of the valve slot 125 to pull down and release the valve from the detents 116. Upon downward movement of the valve and sleeve assembly below the position of Fig. 9 (and to the position at which passage 130 communicates with passage 131), fluid starts to exhaust through valve bore 118, port 127, passage 128, port 129, passages 130 and 131 into the exhaust 113, passages 128 and 130 being formed as vertical grooves in the outer surfaces of the valve and sleeve, respectively, and passage 131 being grooved in the body wall directly below passage 130. Fluid exhaust continues through these courses during downward movement of the valve and sleeve together, and until the valve has become released from the detents and thrown downward by spring 119 to the position of Fig. 10, in which the fluid exhaust then occurs through the registering ports 127 and 132 directly to the outlet port 113.

During the upward stroke of the piston, passage 114 and the master valve chamber are open to the exhaust port 113 through ports 127 and 132, and also passages 131 and 133, until the latter is closed off by its lower end moving above the upper end of passage 132. At this point, port 126 comes into registration with port 112 to again communicate the operating fluid pressure to the master valve. During final upward travel of the piston, the valve 115 becomes reengaged by the detents, returning the parts to the positions shown in Fig. 8.

I claim:

1. In a rail car moving mechanism, a continuously driven pump, an accumulator into which fluid is discharged by the pump under pressure, a driving member applicable to the car wheel to rotate same, a piston operatively connected to said driving member, and means for actuating said piston by the accumulator fluid pressure.

2. In a rail car moving mechanism, a continuously driven pump, an accumulator into which fluid is discharged by the pump under pressure, a driving member applicable to the car wheel to rotate same, a piston operatively connected to said driving member, means for actuating said piston in both of its strokes by the accumulator fluid pressure, and valve means controlling the communication of fluid pressure to the piston.

3. In a rail car moving mechanism, a continuously driven pump, an accumulator into which fluid is discharged by the pump under pressure, an oscillatory lever applicable to the car wheel to rotate same, a cylinder communicable with said accumulator and reservoir, a piston in said cylinder operatively connected to said driving member and actuated by the accumulator fluid pressure, and valve means controlling the communication of fluid pressure to the cylinder and the discharge of fluid from the cylinder to said reservoir.

4. In a rail car moving mechanism, a carriage movable longitudinally on the rail, a driving member applicable to the car wheel to rotate same, a cylinder mounted on said carriage, a piston in said cylinder operatively connected to said driving member, means for supplying fluid under pressure to said cylinder to actuate said piston in both of its strokes, and valve means for controlling the communication of fluid pressure to the cylinder.

5. In a rail car moving mechanism, a carriage movable longitudinally on the rail, a driving member applicable to the car wheel to rotate same, a cylinder mounted on said carriage, a piston in said cylinder operatively connected to said driving member, means for supplying fluid under pressure to said cylinder to actuate said piston in both of its strokes, and valve means for controlling the communication of fluid pressure to the cylinder, said valve means comprising a pilot valve actuated by the piston, and a master valve operated by fluid pressure in accordance with movements of the pilot valve.

6. In a rail car moving mechanism, a continuously driven pump, an accumulator into which fluid is discharged by the pump under pressure, an oscillatory lever applicable to the car wheel to rotate same, a cylinder communicable with said accumulator and reservoir, a piston in said cylinder operatively connected to said driving member and actuated by the accumulator fluid pressure, and valve means controlling the communication of fluid pressure to the cylinder and the discharge of fluid from the cylinder to said reservoir, said valve means comprising a pilot valve actuated by the piston, and a master valve operated by fluid pressure in accordance with movements of the pilot valve.

7. In a flanged wheel rail car moving mechanism, a carriage movable along a car rail, a driving member mounted on the carriage and applicable to the car wheel to rotate same, means for operating said driving member, a leaf type spring mounted on the carriage, and means carried by said spring and engageable with the inside of the car wheel flange to cause the carriage to follow the wheel.

8. In a flanged wheel rail car moving mechanism, a carriage movable along a car rail, a driving member mounted on the carriage and applicable to the car wheel to rotate same, means for operating said driving member, a leaf type spring mounted on the carriage, means carried by said spring and engageable with the inside of the car wheel flange to cause the carriage to follow the wheel, and means for adjusting the position of said spring radially of the wheel.

9. In a flanged wheel rail car moving mechanism, a carriage movable along a car rail, a driving member mounted on the carriage and applicable to the car wheel to rotate same, means for operating said driving member, a leaf type spring mounted on the carriage, means carried by said spring and engageable with the inside of the car wheel flange to cause the carriage to follow the wheel, means pivotally connecting one end of the spring to the carriage, and means for adjusting the opposite end of the spring to vary the position of the spring radially of the wheel.

10. In a flanged wheel rail car moving mechanism, a carriage movable along a car rail, a driving member mounted on the carriage and applicable to the car wheel to rotate same, means for operating said driving member, a leaf type spring mounted on the carriage, and means carried by said spring and engageable with the inside of the car wheel flange and with the outside of the wheel opposite said flange to cause the carriage to follow the wheel.

11. In a flanged wheel rail car moving mechanism, a carriage movable along a car rail, a driving member mounted on the carriage and applicable to the car wheel to rotate same, means for operating said driving member, a leaf type spring mounted on the carriage and inclined in the direction of the wheel curvature, and means carried by said spring and engageable with the inside of the car wheel flange to cause the carriage to follow the wheel.

12. In a rail car moving mechanism, a continuously driven pump, an accumulator into which fluid is discharged by the pump under pressure, a driving member applicable to the car wheel to rotate same, a piston operatively connected to said driving member, and means for actuating said piston by the accumulator fluid pressure, said means comprising a pilot valve controlled by and movable relative to the piston, and a master valve controlling communication of the accumulator fluid pressure to the piston and operated by fluid pressure under control of the pilot valve.

13. In a rail car moving mechanism, a continuously driven pump, an accumulator into which fluid is discharged by the pump under pressure, a driving member applicable to the car wheel to rotate same, a piston operatively connected to said driving member, and means for actuating said piston by the accumulator fluid pressure, said means comprising a pilot valve controlled by and movable relative to the piston, latch means releasably holding said pilot valve against movement with the piston, and a master valve controlling communication of the accumulator fluid pressure to the piston and operated by fluid pressure under control of the pilot valve.

14. In a rail car moving mechanism, a continuously driven pump, an accumulator into which fluid is discharged by the pump under pressure, a driving member applicable to the car wheel to rotate same, a piston operatively connected to said driving member, and means for actuating said piston by the accumulator fluid pressure, said means comprising a pilot valve controlled by and movable relative to the piston, latch means releasably holding said pilot valve against movement with the piston, a spring for actuating the pilot valve when released by said latch means, and a master valve controlling communication of the accumulator fluid pressure to the piston and operated by fluid pressure under control of the pilot valve.

15. In a rail car moving mechanism, a continuously driven pump operating to discharge fluid under pressure, a driving member applicable to the car wheel to rotate same, and means for operating said member by the pressure of said fluid.

16. In a rail car moving mechanism, a continuously driven pump operating to discharge fluid under pressure, an oscillatory lever applicable to the car wheel to rotate same, and means for operating said member by the pressure of said fluid.

17. In a rail car moving mechanism, a continuously driven pump operating to discharge fluid under pressure, a fluid reservoir from which said pump takes suction, a driving member applicable to the car wheel to rotate same, and means for operating said member by the pressure of said fluid and for returning the fluid to said reservoir.

18. In a rail car moving mechanism, a continuously driven pump operating to discharge fluid under pressure, a fluid reservoir from which said pump takes suction, an oscillatory lever applicable to the car wheel to rotate same, and means for operating said member by the pressure of said fluid and for returning the fluid to said reservoir.

19. In a rail car moving mechanism, a continuously driven pump operating to discharge fluid under pressure, a driving member applicable to the car wheel to rotate same, a piston operatively connected to said driving member, and means for actuating said piston by the pressure of said fluid.

20. In a rail car moving mechanism, a continuously driven pump operating to discharge fluid under pressure, a driving member applicable to the car wheel to rotate same, a piston operatively connected to said driving member, means for actuating said piston in both of its strokes by the pressure of said fluid, and valve means controlling the communication of fluid pressure to the piston.

HAROLD C. PIERCE.